United States Patent
Chon et al.

(10) Patent No.: US 6,266,404 B1
(45) Date of Patent: Jul. 24, 2001

(54) METHOD AND APPARATUS FOR CONTROLLING CHARACTERISTICS OF DISTRIBUTED TELEPHONE SETS FROM A CENTRAL TELEPHONE SWITCH

(75) Inventors: Bae-Sik Chon, San Jose; Trang Ngo, Sunnyvale, both of CA (US)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/001,510

(22) Filed: Dec. 31, 1997

(51) Int. Cl.[7] .......................... H04M 3/42; H04M 11/00; H04M 1/00; H04M 3/00
(52) U.S. Cl. .................. 379/201; 379/93.17; 379/93.29; 379/157; 379/207; 379/246; 379/915; 379/916
(58) Field of Search ...................................... 379/201, 207, 379/157, 229, 230, 245, 246, 258, 914, 915, 916, 93.17, 93.29

(56) References Cited

U.S. PATENT DOCUMENTS

| | | | |
|---|---|---|---|
| 4,905,274 | * 2/1990 | Cooper et al. | 379/157 |
| 4,932,022 | 6/1990 | Keeney et al. . | |
| 4,959,856 | * 9/1990 | Bischoff et al. | 379/245 |
| 5,309,509 | * 5/1994 | Cocklin et al. | 379/157 |
| 5,355,404 | * 10/1994 | LeDuc et al. | 379/201 |
| 5,371,788 | 12/1994 | Baals et al. . | |
| 5,377,261 | * 12/1994 | Baals et al. | 379/201 |
| 5,381,461 | 1/1995 | Baals et al. . | |
| 5,381,463 | 1/1995 | Baals et al. . | |
| 5,412,713 | 5/1995 | Baals et al. . | |
| 5,461,666 | * 10/1995 | McMahan et al. | 379/157 |
| 5,479,476 | 12/1995 | Finke-Anlauff . | |
| 5,485,511 | * 1/1996 | Iglehart et al. | 379/157 |
| 5,487,104 | 1/1996 | Baals et al. . | |
| 5,550,915 | 8/1996 | Partridge et al. . | |
| 5,615,257 | 3/1997 | Pezzullo et al. . | |
| 5,631,954 | * 5/1997 | Evans et al. | 379/202 |
| 5,761,288 | * 6/1998 | Pinard et al. | 379/201 |
| 5,774,537 | * 6/1998 | Kim | 379/157 |
| 5,790,648 | * 8/1998 | Bailis et al. | 379/230 |
| 5,809,127 | * 9/1998 | Ostrcil | 379/229 |
| 5,898,772 | * 4/1999 | Connors et al. | 379/216 |
| 6,058,167 | * 5/2000 | Iglehart et al. | 379/915 X |

* cited by examiner

Primary Examiner—Harry S. Hong
(74) Attorney, Agent, or Firm—Blakely Sokoloff Taylor & Zafman

(57) ABSTRACT

The present invention allows characteristics of individual distributed telephone sets to be controlled by a central telephone switch. In one embodiment, configuration files are stored locally on the phone set, but control of the configuration files is provided by the phone switch. Alternatively, configurations files may be stored on the phone switch. When modifying the configurations of a particular phone set, the phone switch dynamically determines the options that are available based on factors such as phone set model and additional hardware connected to the phone set. The phone switch provides a menu or other means for modifying characteristics of the phone set. The menu provides options only for characteristics available on the phone set. The user of the phone set interacts with the menu to confirm or modify the characteristics of particular phone set.

14 Claims, 4 Drawing Sheets

METHOD AND APPARATUS FOR CONTROLLING CHARACTERISTICS OF DISTRIBUTED TELEPHONE SETS FROM A CENTRAL TELEPHONE SWITCH

FIELD OF THE INVENTION

The present invention relates to telephone networks, and more specifically, to controlling characteristics of individual distributed telephone sets in a telephone network from a central telephone switch.

BACKGROUND OF THE INVENTION

In the prior art, it is common for telephone sets to be individually configurable. These sets allow users to change, for example, ring volume, ring tone, type of ring, etc. that a particular telephone set uses. Such systems allow users a measure of customization to personalize their telephone set to their personal tastes.

Configurable telephone sets of the prior art have static characteristics that are controlled locally by the telephone set. Thus, prior art telephone sets must be replaced or have hardware replaced in order to provide additional features not originally offered. Thus, upgrading such telephone sets requires location and replacement or physical modification of each phone set to be upgraded. In a large complex or corporation, this could be a time consuming and difficult task.

Therefore, a need exists for a phone set having characteristics that are controllable from a central phone switch. The present invention provides a method and apparatus for controlling phone set characteristics from a central phone switch.

SUMMARY OF THE INVENTION

A method and apparatus for controlling characteristics of distributed telephone sets from a central telephone switch is described. Multiple phone sets having characteristics configurable by a user thereof are coupled to a phone switch that controls characteristics of phone sets connected thereto. In one embodiment, configuration options available are dynamically controlled based on characteristics supported by the particular phone set.

BRIEF DESCRIPTION OF THE DRAWINGS

The present invention is illustrated by way of example, and not by way of limitation, in the figures of the accompanying drawings in which like reference numerals refer to similar elements and in which.

DETAILED DESCRIPTION

A method and apparatus for controlling phone set characteristics from a central phone switch is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid obscuring the present invention.

Briefly, the present invention allows characteristics of individual distributed telephone sets to be controlled by a central telephone switch. In one embodiment, configuration files are stored locally on the phone set, but control of the configuration files is provided by the phone switch. Alternatively, configurations files may be stored on the phone switch.

When modifying the configurations of a particular phone set, the phone switch dynamically determines the options that are available based on factors such as phone set model and additional hardware connected to the phone set. The phone switch provides a menu or other means for modifying characteristics of the phone set. The menu provides options only for characteristics available on the phone set. The user of the phone set interacts with the menu to confirm or modify the characteristics of particular phone set.

Figure 1:
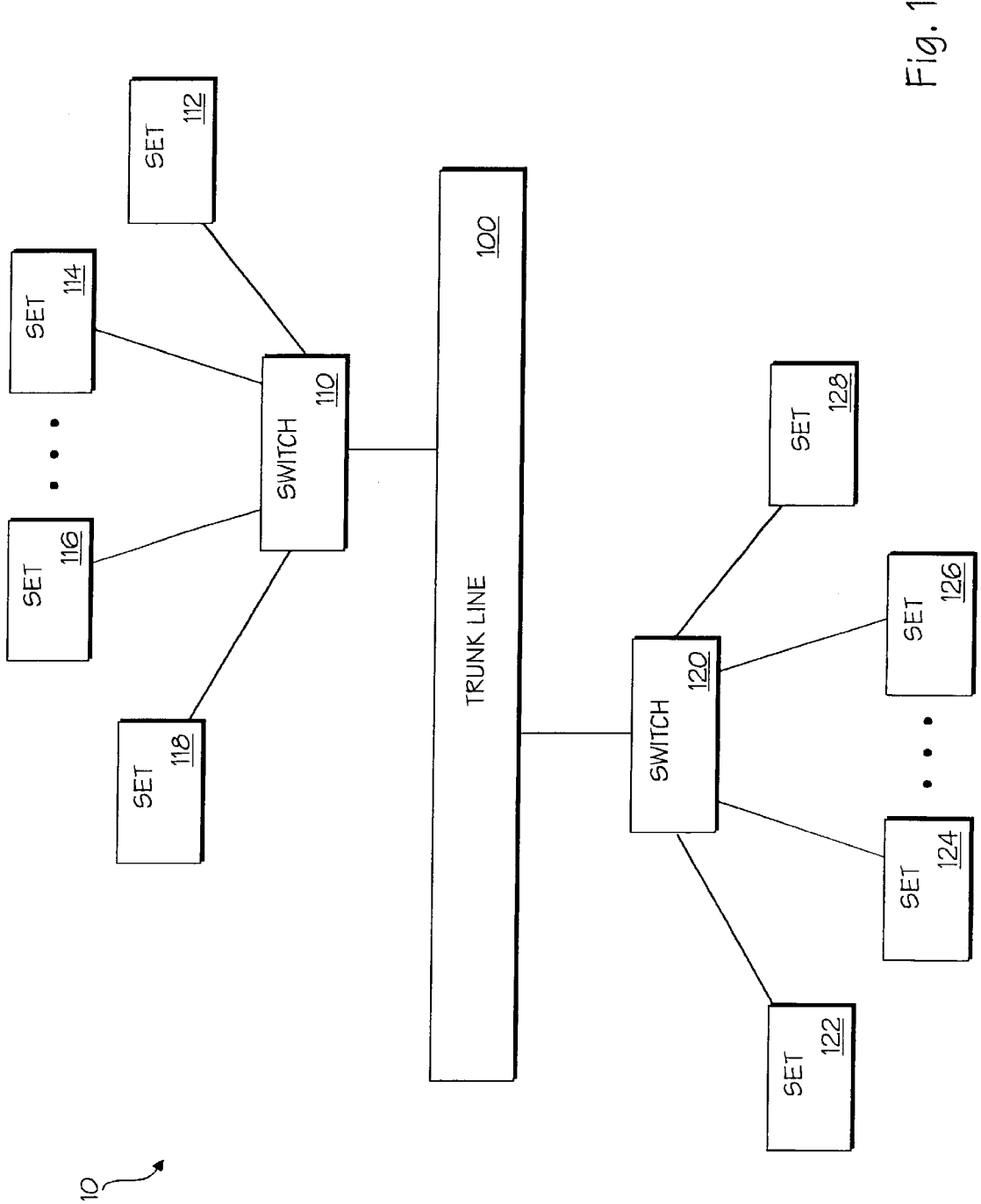
FIG. 1 is one embodiment of a block diagram of a telephone network.

FIG. 1 is one embodiment of a block diagram of a telephone network. In general, a telephone system includes multiple phone switches coupled to a trunk line that allows the phone switches to intercommunicate. Each switch is coupled to one or more phone sets to form a smaller network.

Trunk line 100 provides the basis for public phone system 10. Trunk line 100 interconnects multiple phone switches that intercommunicate to provide telephone services to users of the public telephone system 10. Trunk line 100 may be provided, for example, by a local telephone company; however, other trunk line schemes may be used. Because trunk lines are well known and not central the present invention, further description is not provided herein.

Telephone switches, such as phone switches 110 and 120 provide an interface between trunk line 100 and phone sets coupled to the phone switches. In FIG. 1, sets 112, 114, 116 and 118 are coupled to phone switch 110 and sets 122, 124, 126 and 128 are coupled to phone switch 120. However, a much larger number of phone sets may be coupled to each phone switch. In addition, a much larger number of phone switches may be coupled to trunk line 100. The phone switches receive incoming calls from trunk line 100 and determine which phone set corresponds to the number being called. The phone switch then directs the call to the appropriate phone set.

Multiple phone sets are coupled to each phone switch and while phone sets may have different functionality, the phone sets share a common set of functions. For example, each phone set includes a speaker and a microphone to allow a user to communicate with another user of public telephone system 10. In addition, each phone set includes a means for dialing a telephone number, such as a keypad, and other features necessary to provide a functional phone system.

In one embodiment of the present invention, phone switches control characteristics of phone sets coupled to the phone switch. Characteristics that may be controlled by a switch include, but are not limited to, ring volume, ring tone, ring type, display contrast, display language, time format, date format, call timer, key click mode, and headset select. In one embodiment, characteristics for a particular phone set are stored in the phone set in the form of characteristics files. Alternatively, characteristics files may be stored on the phone switch. The phone switch controls the characteristics of the phone set regardless of where the characteristics files are stored. p By controlling phone set characteristics from a phone switch, the characteristics may be upgraded or repaired by modifications to the phone switch rather than to each individual phone set. In addition, each phone set may be made less expensive by reducing the hardware functionality required and thereby providing a more cost effective telephone network.

Figure 2:
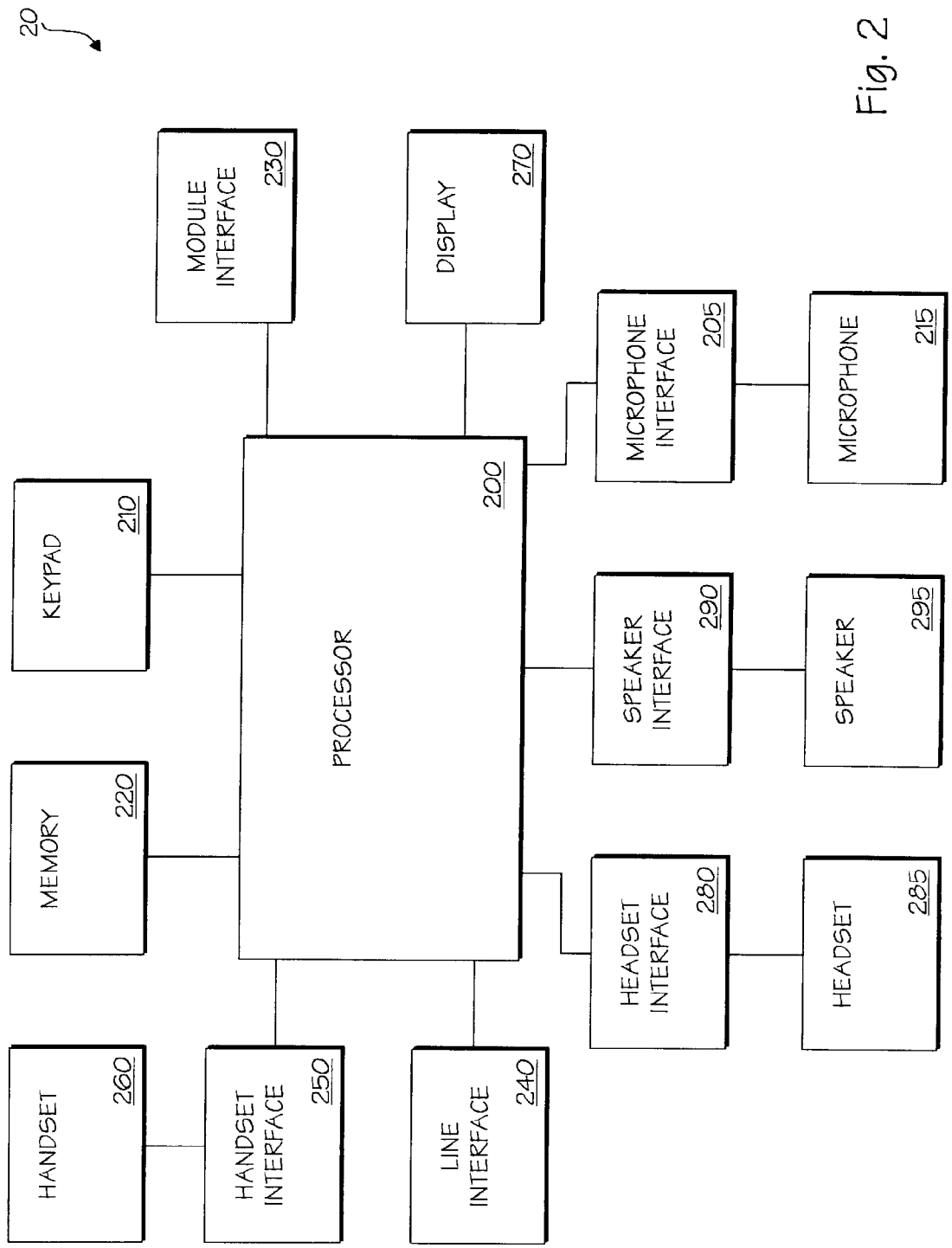
FIG. 2 is one embodiment of a block diagram of a telephone set that may have characteristics controlled by a telephone switch according to the present invention.

FIG. 2 is one embodiment of a block diagram of a telephone set that may have characteristics controlled according to the present invention. Phone set 20 generally includes processor 200 coupled to keypad 210, memory 220, module interface 230, line interface 240, display 270 and handset interface 250, which is coupled to handset 260.

Handset 260 is a hand-held device that includes a speaker and microphone to allow a user of phone set 20 to speak and listen to a user of another phone set. Alternatively, handset 260 may be replaced by or coexist with a headset or separate microphones and speakers. Handset interface 250 is coupled to handset 260 and includes devices such as analog-to-digital converter(s) and digital-to-analog converter(s) as well as other hardware known in the art. Handset interface 250 is coupled to processor 200.

Headset 285 is a hands-free device that allows the user of phone set 20 to use phone set 20 without holding a handset, such as handset 260. Headset interface 280 is coupled between processor 200 and headset 285 and includes devices such as analog-to-digital converter(s) and digital-to-analog converter(s) as well as other hardware known in the art.

Speaker 295 is used to amplify audio signals received by phone set 20. Speaker 295 is coupled to speaker interface 290, which includes digital-to-analog converter(s) as well as other hardware known in the art. Speaker interface 290 and speaker 295 may be used to allow phone set 20 may be used to output audio signals received or to provide feedback to the user about characteristic configurations of phone set 20.

Microphone 215 is used to receive audio input that may be used to communicate with another phone set user or for another purpose. Microphone interface 205 is coupled to microphone 215 and includes analog-to-digital converter(s) and other hardware known in the art. Microphone 215, microphone interface 215, speaker 295 and speaker interface 290 may be used to allow phone set 20 to operate as a speaker phone.

Processor 200 controls phone set 20 by interconnecting the various elements of phone set 20; however processor 200 does not control configuration of the characteristics of phone set 20. Processor 200 simply uses the configured characteristics. Processor 200 communicates with a remote phone switch (not shown in FIG. 2) via line interface 240. The phone switch controls the characteristics of phone set 20. Processor 200 is coupled to memory 220 that stores data and instructions used by processor 200 to perform processing functions. Memory 220 may be random access memory (RAM), read-only memory (ROM), electrically erasable programmable read-only memory (EEPROM), or anther type of memory. In one embodiment, memory 220 stores configuration data for phone set 20 in the form of one or more configuration files.

Processor 200 provides a communication path between handset 260 and the phone switch. Processor 200 also enables other features such as a ring when an incoming call is received and control of converters in handset interface 250. Keypad 210 is a numerical pad or other type of input device that allows the user to dial a phone number. Module interface 230 allows plug-in or add-on modules to be coupled to phone set 20. These modules may include speed dial modules, a modem, or a module that allows the user to otherwise control the behavior of phone set 20.

Display 270 allows the user to interact with phone set 20 and the phone switch to configure the characteristics of phone set 20. In one embodiment, display 270 provides menus that allow the user to configure only the characteristics that are available to phone set 20. In other words, if phone set 20 does not provide a particular feature, configuration options related to the feature are not shown on display 270 even though phone sets coupled to the same phone switch provide the feature. Also, characteristics that may be configured are monitored by the phone switch to allow configuration only of the features currently provided by phone set 20. For example, display 270 provides menu options for setting handset speaker volume and handset microphone sensitivity only when handset 260 is coupled to phone set 20. If, instead of handset 260, a headset is coupled to phone set 20, display 270 displays configuration choices specific to a headset. Thus, if the user is configuring characteristics for handset 260 and during configuration handset 260 is removed from phone set 20, the menu shown on display 270 is updated to remove configuration options related to handset 260. Display 270 is also updated dynamically in a similar manner for other configuration options, such as plug-in module, display contrast, modem, etc.

In one embodiment, the user makes selections from menus on display 270 via softkeys (i.e., keys that are redefinable). Alternatively, the user may make selections by pressing buttons on keypad 210 or by speaking into a microphone. The user may initiate the configuration sequence by pressing a hardkey (i.e., a key that performs a specific function) on the phone set. Alternatively, the user may use a softkey, or other device to initiate the configuration sequence.

Figure 3:
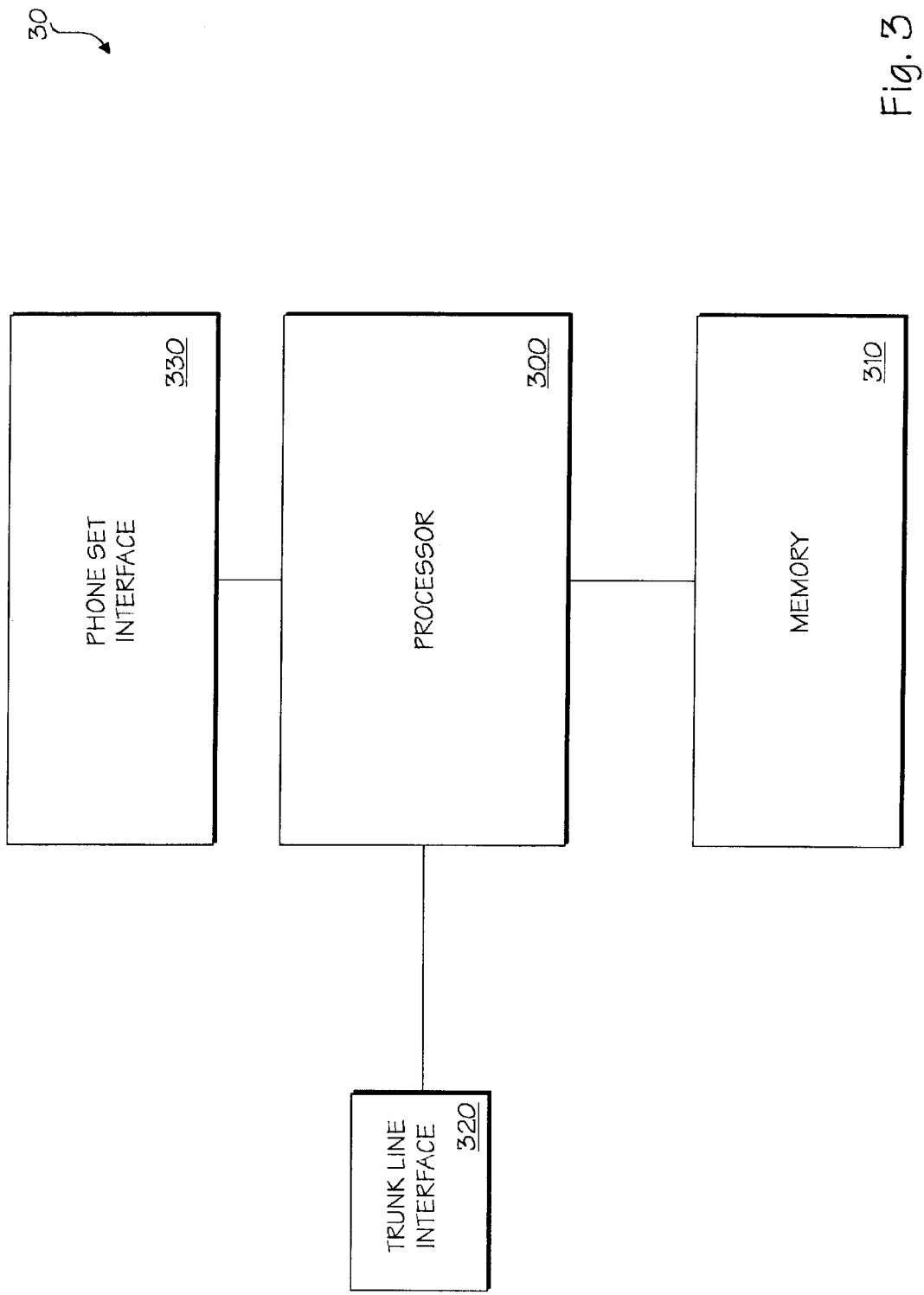
FIG. 3 is one embodiment of a telephone switch that may control telephone set characteristics according to the present invention.

FIG. 3 is one embodiment of a block diagram of a telephone switch that may control telephone set characteristics according to the present invention. Phone switch 30 generally includes processor 300 coupled to memory 310, trunk line interface 320 and phone set interface 330.

Processor 300 controls phone switch 30 by performing many of the features of phone switch 30. For example, processor 300 receives incoming calls and determines which phone set should receive the call. Processor 300 directs calls to the appropriate phone set. Processor 300 also controls characteristics of the multiple phone sets coupled to phone switch 30. Memory 310 is coupled to processor 300 and is used to store data and instructions for processing by processor 300. In one embodiment, memory 310 stores configuration files for the phone sets coupled to phone switch 30. Memory 310 may be RAM, ROM, EEPROM, or any other type of memory.

Trunk line interface 320 provides an interface between processor 300 and trunk line 100 (not shown in FIG. 3) such that devices coupled to phone switch 30 may communicate with other devices coupled to trunk line 100. Phone set interface 330 is coupled to processor 300 and provides an interface between processor 300 and multiple phone sets such that the phone sets may communicate over trunk line 100 and phone switch 30 can control individual phone set characteristics.

In one embodiment, when a user of a phone set wishes to configure the characteristics of a particular phone set, the user presses a button or otherwise indicates that he or she wishes to configure the characteristics of the phone set. For example, the user may press a button, such as a softkey or a hardkey, on the phone set, or the user may dial a predetermined number or activate a switch. When configuring the characteristics of a phone set, processor 300 communicates with the phone set via phone set interface 330 to determine which characteristics are available for the user to configure and generates a menu displayed on the phone set that allows the user to configure the characteristics of the phone set. Processor 300 periodically re-evaluates the characteristics available for configuration and updates configuration options accordingly such that menus are updated dynamically during the configuration sequence. Processor 300 may also be notified of changes made to phone set characteristics. When configuration is complete, data describing the characteristics of the phone set may be stored in the phone set or in memory 310.

Phone switch 30 also controls characteristics of phone sets by determining what characteristics are available to each phone set. For example, phone switch 30 may provide a set of characteristics and each phone set coupled to phone switch 30 is provided with a subset (or the full set) of the characteristics that is selected to meet the needs of the user of a particular phone set. Thus, characteristics provided by the phone switch to a particular phone set may be added or deleted depending on the needs of the user.

Figure 4:
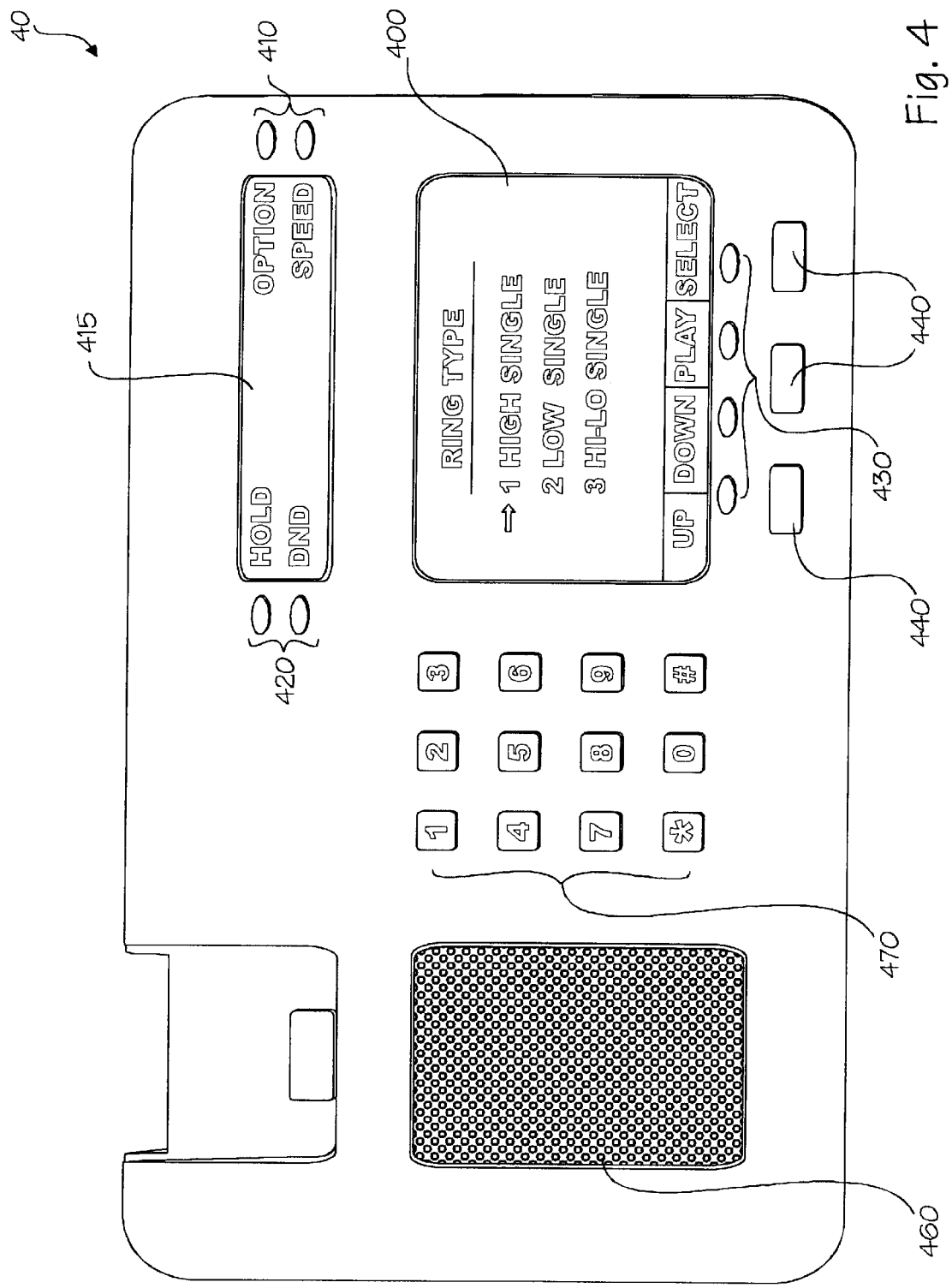
FIG. 4 is one embodiment of a top view of a telephone set that may have characteristics controlled according to the present invention.

FIG. 4 is one embodiment of a top view of a telephone set that may have characteristics controlled according to the present invention. For simplicity, the phone set of FIG. 4 is shown without a handset; however, the following description applies to phone sets with handsets and phone sets with alternate devices used in place of, or in addition to, a handset, such as a headset.

Speaker 460 allows phone set 40 to be used as a speaker phone and is not required to practice the present invention. Keys 470 are used to dial phone numbers and for other purposes for which phone set keys are used. Keys 470 may also be used to navigate menus on display 400.

In one embodiment, softkeys 410 and 420 may be programmed for specific functions such as putting a caller on hold, setting phone set 40 for "do not disturb" (DND), etc. The options programmed are shown on display 415. Hardkeys 440 provide specific functionality, such as initiating characteristic configuration, accessing voice mail, etc.

In one embodiment, display 400 and softkeys 430 are used to configure the characteristics for phone set 40 in response to options and/or menus provided by the phone switch. A user may, for example, begin characteristic configuration by pressing a hardkey, such as one of hardkeys 440. The processor and other hardware of phone set 40 communicate with the phone switch to initiate configuration. The phone switch determines which characteristics from a set of possible characteristics phone set 40 is capable of providing. The switch communicates menu and option data to phone set 40 to be displayed on display 400.

In one embodiment, display 400 provides a menu from which the user may make selections with softkeys 430. For example, if the user were selecting a ring type for phone set 40, display 400 may list several ring types from which the user may choose. Softkeys 430 may, for example, allow the user to choose a type of ring and play the ring as part of the configuration process. Finally, the user may select a ring type to become part of the configuration file for phone set 40. The ring type selected is communicated to the phone switch for further processing. The phone switch updates the configuration file for phone set 40 so that the selected ring type is used when phone set 40 rings. Configuration of other phone set characteristics are accomplished in a similar manner.

It is important to note that the phone switch monitors the hardware and software available to phone set 40 so that changes are reflected dynamically in the menu choices provided by display 400. Thus, if the user were to add functionality to phone set 40 by, for example, adding a plug-in module, configuration options related to the plug-in module are updated by the phone switch such that the user simply physically connects the plug-in module to phone set 40 and the phone switch updates configuration options and/or software on phone set 40.

The phone switch may also upgrade or add characteristics to phone set 40. The upgraded or added characteristics are included in the configuration menus only when added by the phone switch. Thus, the user is not presented with menu options that do not apply to the particular phone set being configured.

By controlling characteristics for phone sets at a central phone switch, many phone sets my be upgraded or fixed by simply modifying software on the phone switch or selecting characteristics for particular phone sets with the phone switch. Also, by dynamically updating configuration options available, the user is provided with feedback as to whether hardware and/or software on a particular phone set is properly installed.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A telephone network comprising:
a plurality of phone sets having configurable operating characteristics that control the local operation of the respective phone sets, the operating characteristics being configurable by a user thereof; and
a phone switch coupled to the plurality of phone sets, wherein the switch controls the operating characteristics of phone sets connected thereto, the phone switch dynamically updates the operating characteristics that are available to be configured based upon operating characteristics supported by the phone sets.

2. The telephone network of claim 1, wherein the plurality of phone sets each further comprise a menu allowing the user to select and configure operating characteristics of the respective phone set, wherein the menu is dynamically updated by the phone switch to offer operating characteristic options based on the operating characteristics supported by the respective phone set.

3. The telephone network of claim 2, wherein the plurality of phone sets each further comprise a plurality of softkeys that allow the user to select and configure the operating characteristics of the respective phone set.

4. A telephone network comprising:
a plurality of phone sets having configurable operating characteristics that control the local operation of the respective phone sets, the operating characteristics being configurable by a user thereof; and
a phone switch coupled to the plurality of phone sets, wherein the switch controls the operating characteristics of phone sets connected thereto, the operating characteristics comprise one or more of:
a ring volume for the respective phone set;
a ring tone for the respective phone set;
a display contrast for a display on the respective phone set;

a do not disturb option for the respective phone set;
a display language;
a time format;
a date format;
a call timer format;
a key click mode; and
an automatic headset select.

5. A phone set comprising:
a switch interface to communicate with a phone switch;
a component interface to receive a handset and to communicate with the switch interface;
one or more displays to display a user interface dynamically controlled by the phone switch wherein the user interface is dynamically updated by the phone switch based on capabilities of the phone set; and
one or more softkeys that allow a user to interact with the display and the phone switch to control operating characteristics of the phone set wherein the operating characteristics control the local operation of the respective phone set.

6. The phone set of claim 5 further having a plurality of phone set characteristics that are user configurable and stored in the phone switch.

7. A phone set comprising:
a switch interface to communicate with a phone switch;
a component interface to receive a handset and to communicate with the switch interface;
one or more displays to display a user interface dynamically controlled by the phone switch; and
one or more softkeys that allow a user to interact with the display and the phone switch to control operating characteristics of the phone set wherein the operating characteristics control the local operation of the respective phone set, the operating characteristics of the phone set comprise one or more of:
a ring volume for the respective phone set;
a ring tone for the respective phone set;
a display contrast for a display on the respective phone set;
a do not disturb option for the respective phone set;
a display language;
a time format;
a date format;
a call timer format;
a key click mode; and
an automatic headset select.

8. A phone switch comprising:
a phone set interface configured to communicate with a plurality of phone sets;
a processor coupled to the phone set interface, the processor controls operating characteristics of the plurality of phone sets coupled to the phone set interface, the processor dynamically updates the operating characteristics that are available to be configured based on operating characteristics supported by the phone sets, wherein the operating characteristics control the local operation of the respective phone sets; and
a memory coupled to the processor.

9. The phone switch of claim 8 wherein operating characteristics for a particular phone set are stored in a configuration filed for the particular phone set and the configuration file is stored on the particular phone set.

10. A phone switch comprising:
a phone set interface configured to communicate with a plurality of phone sets;
a processor coupled to the phone set interface, the processor controlling operating characteristics of the plurality of phone sets coupled to the phone set interface, wherein the operating characteristics control the local operation of the respective phone sets; and
a memory coupled to the processor, wherein the operating characteristics comprise one or more of:
a ring volume for the respective phone set;
a ring tone for the respective phone set;
a display contrast for a display on the respective phone set;
a do not disturb option for the respective phone set;
a display language;
a time format;
a date format;
a call timer format;
a key click mode; and
an automatic headset select.

11. A method for configuring operating characteristics of a phone set comprising:
controlling, with a phone switch, a set of operating characteristics supported by the phone set, wherein the operating characteristics control the local operation of the phone set;
dynamically updating the set of operating characteristics that are available to be configured for the phone set based upon the set of operating characteristics supported by the phone set;
displaying the set of operating characteristics on the phone set, wherein the display is controlled by the phone switch; and
storing the set of operating characteristics.

12. A method for configuring operating characteristics of a phone set comprising:
controlling, with a phone switch, a set of operating characteristics supported by the phone set, wherein the operating characteristics control the local operation of the phone set;
displaying the set of operating characteristics on the phone set, wherein the display is controlled by the phone switch; and
storing the set of operating characteristics, wherein the operating characteristics comprise one or more of:
a ring volume for the respective phone set;
a ring tone for the respective phone set;
a display contrast for a display on the respective phone set;
a do not disturb option for the respective phone set;
a display language;
a time format;
a date format;
a call timer format;
a key click mode; and
an automatic headset select.

13. A machine-readable medium comprising instructions which, when executed by a machine, cause the machine to perform operations comprising:
controlling with a phone switch, a set of operating characteristics supported by a phone set, wherein the operating characteristics control the local operation of the respective phone set;
dynamically updating the set of operating characteristics that are available to be configured for the phone set based upon the operating characteristics supported by the phone set;

displaying the set of operating characteristics on the phone set, wherein the display is controlled by the phone switch; and storing the set of operating characteristics.

14. A machine-readable medium comprising instructions which, when executed by a machine, cause the machine to perform operations comprising:

controlling, with a phone switch, a set of operating characteristics supported by a phone set, wherein the operating characteristics control the local operation of the respective phone set;

displaying the set of operating characteristics on the phone set, wherein the display is controlled by the phone switch; and storing the set of operating characteristics, wherein the operating characteristics comprise one or more of:
a ring volume for the respective phone set;
a ring tone for the respective phone set;
a display contrast for a display on the respective phone set;
a do not disturb option for the respective phone set;
a display language;
a time format;
a date format;
a call timer format;
a key click mode; and
an automatic headset select.

* * * * *